United States Patent
Gottfriedsen et al.

(10) Patent No.: US 12,366,477 B2
(45) Date of Patent: Jul. 22, 2025

(54) TEST BODY SYSTEM

(71) Applicant: Wipotec GmbH, Kaiserslautern (DE)

(72) Inventors: Jan Gottfriedsen, Waldfischbach-Burgalben (DE); Tobias Stellwagen, Kaiserslautern (DE)

(73) Assignee: Wipotec GmbH, Kaiserslautern (DE)

( * ) Notice: Subject to any disclaimer, the term of this patent is extended or adjusted under 35 U.S.C. 154(b) by 601 days.

(21) Appl. No.: 17/786,466

(22) PCT Filed: Dec. 18, 2020

(86) PCT No.: PCT/DE2020/101079
§ 371 (c)(1),
(2) Date: Dec. 12, 2022

(87) PCT Pub. No.: WO2021/121486
PCT Pub. Date: Jun. 24, 2021

(65) Prior Publication Data
US 2023/0221171 A1  Jul. 13, 2023

(30) Foreign Application Priority Data

Dec. 20, 2019 (DE) .......................... 102019135601.6

(51) Int. Cl.
*G01G 21/26* (2006.01)
*G01G 21/22* (2006.01)

(52) U.S. Cl.
CPC ............. *G01G 21/26* (2013.01); *G01G 21/22* (2013.01)

(58) Field of Classification Search
CPC ................................ G01G 21/26; G01G 21/22
USPC ........................................................... 177/50
See application file for complete search history.

(56) References Cited

U.S. PATENT DOCUMENTS

| | | | |
|---|---|---|---|
| 3,396,573 A | 8/1968 | Blubaugh | |
| 5,492,701 A * | 2/1996 | Cervos | B01J 13/043 424/490 |
| 6,648,715 B2 | 11/2003 | Weins | |
| 7,396,334 B2 * | 7/2008 | Kuhr | A61B 5/150022 600/583 |
| 9,434,224 B2 * | 9/2016 | Schulte | B60D 1/182 |
| 10,132,906 B2 * | 11/2018 | Hughes | G01R 35/005 |
| 11,613,296 B2 * | 3/2023 | Grigorians-Sohruli | B62D 1/187 74/493 |

FOREIGN PATENT DOCUMENTS

| | | |
|---|---|---|
| CN | 2574024 Y | 9/2003 |
| CN | 202974415 U | 6/2013 |
| CN | 205843804 U | 12/2016 |

(Continued)

OTHER PUBLICATIONS

DE 102019135601.6 German Patent Office action issued Nov. 19, 2020.

(Continued)

*Primary Examiner* — Jacques M Saint Surin
(74) *Attorney, Agent, or Firm* — Calvert Technology Law, PLLC; Nathan H. Calvert (57) ABSTRACT

The invention relates to a multi-element system for testing measuring systems, by means of which a train of several receiving elements and/or spacer elements lying one behind the other and/or side by side can be formed. The receiving elements have one or more pockets for receiving test weights.

15 Claims, 8 Drawing Sheets

(56) References Cited

FOREIGN PATENT DOCUMENTS

| | | |
|---|---|---|
| DE | 29621304 U1 | 2/1997 |
| DE | 19631709 A1 | 2/1998 |
| DE | 60012300 T2 | 11/2004 |
| DE | 202005010429 U | 9/2005 |
| DE | 202008012406 U1 | 12/2008 |
| DE | 102014013622 B4 | 12/2016 |
| GB | 780321 A | 7/1957 |
| JP | H07139992 A | 6/1995 |
| JP | H1078347 A | 3/1998 |
| JP | 2001289727 A | 10/2001 |
| JP | 6385542 B1 | 9/2018 |

OTHER PUBLICATIONS

PCT/DE2020/101079 International Search Report and Written Opinion issued Mar. 22, 2021.
Japanese Patent Office action issued Jun. 30, 2023 in application JP 2022-537237.

* cited by examiner

Figure 6

TEST BODY SYSTEM

TECHNICAL FIELD OF THE INVENTION

The present invention relates to test body systems for checking measuring systems and methods for such checking.

BACKGROUND OF THE INVENTION

Industrial measuring systems and inspection systems, in particular scales, must be checked for their proper function, in particular for measurement accuracy and measurement stability, for example during a type approval, a calibration test, a calibration, or other checks. This is preferably done by means of suitable test pieces which have certain physical properties to be determined by the measuring system. In the case of scales, for example, this can be a certain weight or a certain weight distribution along a certain length or width of a body.

Dynamically operating measuring systems are designed to move products (e.g., by means of a conveyor such as a belt conveyor) and to record certain physical properties of the products during the movement. In order to be able to test such systems, suitable test bodies with known properties must be moved through the measuring system.

Depending on the measuring range of the measuring system or the order of magnitude of the physical units to be measured (in particular a weight or a weight distribution), it is necessary to provide a test piece with exactly the properties to be measured (in particular a certain test load) in advance. For the proper testing of a dynamic scale, for example, a test body is required (preferably with a certain length and/or width) which has a certain weight or a certain weight distribution along this length or width.

In addition, large test bodies should be equipped with an underside that is as flat and low-wear as possible, which is associated with high costs. Finally, the test body should be as unchangeable as possible in order to be able to deliver reproducible test results.

SUMMARY OF THE INVENTION

It is therefore the task of the invention to provide systems for producing test bodies and methods for checking a measuring system with the aid of such test bodies. The task is solved by, for example, the test body systems and methods according to the following claims.

Test body systems according to a first aspect of the invention comprise at least two elements which can be directly coupled to each other. The elements can be arranged one behind the other in a longitudinal direction X and/or next to one another in a transverse direction Y, which is at right angles to the longitudinal direction X and is preferably horizontal, and can be coupled to one another in order to form a test body comprising the at least two elements, which test body is to be used for checking the measuring system. The train formed by at least two elements can then form a predeterminable total test load, a predeterminable X-length, a predeterminable Y-width or another physical quantity that is to be accurately detected by the measuring system. For this purpose, the train is guided over a surface of the measuring system, which can be, for example, a stationary weighing platform or a weighing belt.

The individual elements of a test body system provided according to the invention may be flexibly and modularly combined or coupled with each other. Instead of providing a separate test body for each desired test load, systems according to the invention may simplify the provision of a total test load that can be put together from different elements. This also significantly reduces storage and transport costs.

The formation of a wear-resistant, flat base surface of individual elements to rest on the surface in the measuring system is also cheaper and easier to realize than for a continuously rigid test body, which in practice can be over 1 m long.

At least one of the elements of a test body system according with the first aspect is a receiving element which is designed to receive individual test weights. By inserting the individual test weights into pockets provided in the receiving element, a predeterminable target weight and a predeterminable weight distribution (initially within the individual receiving element) can be created.

A receiving element according to some implementations of the invention extends with a length $L_A$ in the longitudinal direction X, with a width $B_A$ in the transverse direction Y and with a height $H_A$ in a vertical direction Z extending orthogonally to the longitudinal direction X and to the transverse direction Y. Such a receiving element also has a base surface F for resting on the surface of the measuring system.

Another of the at least two elements of a test body system according to some implementations of the invention can be a further receiving element of the aforementioned type. However, the further receiving element's dimensions may differ partially or completely from the other receiving element, so that, for example, the width is the same, but the length is different. Alternatively, the second element can also be a spacer element, which is not intended to receive test weights, but is primarily intended to form a part of the length or width of the train formed by the elements without adding significant weight. A spacer element extends with a length $L_D$ in longitudinal direction X, with a width $W_D$ in transverse direction Y and with a height $H_D$ in vertical direction Z.

The receiving elements and spacer elements (generally referred to as "elements") of a test body system in accordance with the first aspect can be coupled with each other in longitudinal direction and/or in transverse direction to form a train, whereby a receiving element can be coupled with a further receiving element or a spacer element directly adjacent thereto. Likewise, a spacer element can be coupled with a further spacer element or a receiving element. If a test body system also provides couplings in the transverse direction, couplings in the longitudinal direction are, according to some implementations of the invention, independent of couplings in the transverse direction, so that an element can be coupled in the longitudinal direction and in the transverse direction with different or similar further elements. According to some implementations of the invention, receiving elements and/or spacer elements of a test body system can be modularly assembled in any order, number, length and width to form a train which, by suitably equipping the receiving elements of the train with test weights, has a predeterminable total test load and/or weight distribution along the train's length and width. Of course, a specific test load and weight distribution can also be set for each individual element of the train.

The elements of a test body system according to the first aspect have suitable coupling means to couple elements which are to be arranged adjacent to each other in longitudinal or transverse direction. It should be possible to release the coupling in order to be able to form different arrangements of coupled elements. Preferably, the couplings can be released without tools.

Each receiving element of a test body system comprises a base body with a preferably flat base surface designed to rest on the measuring system and with one or more pockets. The base surface can be continuous or have recesses, which are created by the pockets, for example. The pockets are designed to temporarily hold individual test weights and can have different shapes. The pockets may be cylindrical in shape to accommodate cylindrical test weights of similar dimensions. Preferably, the dimensions of the pockets are adapted as closely as possible to any existing standardized sizes of test weights in order to hold the test weights securely and largely without play during the movement of the train through the measuring system.

The pockets may extend from an upper side O opposite the base surface in vertical direction H into the base body, the upper side preferably being parallel to the base surface on the underside of the base body. The pockets can be formed to different depths to enable the test weights to be arranged at different heights. For this purpose, the pockets have suitable stop means at a predeterminable depth in order to hold a test weight inserted into the pocket. This stop means may be a closed bottom, so that the pocket is designed in the manner of a blind hole. Alternatively, a pocket may fully penetrate the base body and have a step or web to define the height position of an inserted test weight. Unlike a blind hole, a full-length opening of the main body is easier to clean and the accumulation of contaminants in the base of the pocket is also avoided.

A pocket can have means of locking (preferably manually and without tools) that cooperate with an inserted test weight in order to prevent the test weight from falling out of the pocket unintentionally. A pocket can have different geometric cross-sectional shapes, whereby in addition to preferably cylindrical pockets, rectangular or square pockets are also possible in order to be able to accommodate correspondingly designed weights well.

The elements of a test body system according to the first aspect may be made of metallic material or plastic. Composite material, preferably with low weight, is also possible. The elements can, for example, be milled, injection-molded, or manufactured using a 3D printing process.

A spacer element according to some implementations of the invention has a spacer element body with a base surface for resting on the surface of the measuring system. In this respect, such a spacer element is comparable to a receiving element. For weight reduction, this is preferably designed in the manner of a honeycomb or a bar. In this case, the spacer element body can be provided with at least one recess which partially or completely penetrates the body in vertical direction Z. Whereas, according to some implementations of the invention, the receiving elements assume the function of receiving identical or different weights at specific positions within the receiving element, the spacer elements serve to create and largely maintain a predeterminable distance between individual elements, in particular between two receiving elements.

Coupling means are provided to enable the individual elements of a test body system according to the first aspect of the invention to be coupled together. The term "coupling means" is intended to cover all components or connection areas on the individual elements required for coupling two elements. The coupling means may comprise an elastic section to which connecting means are connected on both sides, which in turn can be connected to a respective connection area of an element. A possible connecting means is, for example, a section of a thread which can be inserted through an opening on one side of an element in order to be screwed against the respective element with a nut on the other side of the opening. Alternatively, web-shaped fasteners with an undercut (for example, mushroom-shaped) are conceivable. The webs, which may be arranged in alignment one behind the other (with an elastic section between them), can each be "clipped" or hooked from above into an upwardly open slot on the edge of one of the two elements, with the undercut engaging behind the wall forming the slot. A coupling made in this way is particularly easy to make and release. The elastic section can also be designed as a preferably flange-like extension between the coupled elements, which acts on the respective outer side of each element and thus keeps the two elements at a distance. The elastic element may also be formed by the web itself and/or be formed by or comprise an elastomer.

The coupling means for coupling receiving elements to one another may be designed in the same way as those with which spacer elements are connected to one another or to a respective other element. In addition, the components of the coupling means (such as a slot or bore) formed on the individual elements can be provided at identical positions on the receiving element and on the spacer element, for example centrally on a longitudinal or transverse side, or symmetrically on both sides.

The individual elements of a test body system in accordance with the first aspect may be designed to be assembled into an elongated or flat arrangement of low height. According to some embodiments of the invention, the extension in the vertical direction of the individual elements is therefore not greater than their extension in longitudinal direction X or in transverse direction Y. The length of an element may be at least three times as great as its height and more than five times as great. The individual elements and a train to be formed therefrom is preferably relatively flat, in particular to avoid lift effects and to keep the center of gravity low.

In some embodiments, the height of the receiving elements is identical to the height of the spacer elements. Also, the width of the receiving elements may be identical to the width of the spacer elements. Elements lying one behind the other in the longitudinal direction then form a train of constant width and constant height, which facilitates handling for the testing of the measuring system. However, it is also conceivable to choose the length and/or width of a receiving element smaller or larger than that of a spacer element in order to meet special requirements of the respective measuring system or measuring method.

An element of a test body system according to some implementations of the invention may have the shape of a regular or irregular polygon with a width ($B_A$, $B_D$) and a length ($L_A$, $L_D$) in a cross section perpendicular to the vertical direction Z. At least one side (front side) of such a polygon serves as a "coupling side" to which another element can be coupled. Alternatively or additionally, an element can also have a rounded section that extends over the width ($B_A$, $B_D$) of the respective element. In particular, an element forming the tip or tail of a train can advantageously have such a rounded front in order to reduce possible vibrations or impacts during the transition between rollers or contact surfaces along the conveying path in the measuring system. The rounded section can have the shape of a dished end or an arc, in particular a quarter circle or a semicircle. It is also conceivable to combine several elements to form a full circle. Elements can also have coupling means at a rounded section to enable coupling with a straight or rounded section of another element.

The coupling means (K) coupled to each other may be adapted to transmit tensile and/or shear and/or compressive forces between the two elements, wherein the coupling means are elastic in order to maintain the coupling
  a) to allow a tilting of the elements coupled with each other relative to each other within predeterminable tolerances, in particular about a tilting axis running in longitudinal direction X or transverse direction Y or vertical direction Z, and/or
  b) to allow a translatory movement of the two elements relative to each other, and/or
  (c) damp and/or cushion the transmission of shocks between the two elements.

Surprisingly, it has been shown that the elastic design of the coupling means on the one hand enables a secure and stable tensile and/or shear and/or compression connection of individual elements to each other, while at the same time ensuring sufficient mobility of the individual elements relative to each other, which is desirable for checking the measuring system. Due to the flexible coupling of the elements with each other, the train forming a test body obtains the necessary flexibility to adapt itself along the conveying path through the measuring system to the respective supporting surface in the best possible way and, for example, to load one or more weighing platforms lying one behind the other in a realistic manner. On the other hand, a test piece that is rigid or continuous over its entire length would possibly only rest with its ends or an intermediate area on a completely flat surface in the measuring system and thus falsify the measurement result.

The elastic design of the coupling means not only allows adjacent elements to tilt towards each other, but also a certain height offset (translational displacement) of the coupled elements, for example when moving from one conveyor belt to a slightly higher or lower adjacent conveyor belt. A curve drive (for example in an air-conditioned test laboratory), in which adjacent elements are tilted towards each other about an imaginary tilting axis running in vertical direction Z, is also possible with the help of the coupling means with an elastic design.

Shocks, blows or vibrations that could be transmitted from one element to an adjacent further element by a rigid coupling are advantageously reduced or completely damped by the elastic property of the coupling means.

Some embodiments include two directly coupled elements that form between them a distance, in particular a gap, interrupted only by the coupling means, in order to avoid as far as possible direct contact of the two elements even during their movements relative to each other. The size of the gap or distance between adjacent elements can preferably be adjustable, for example by means of the threaded connecting means described above, along which the position of a countering nut can be selected to adjust the distance. Preferably, the coupling means are designed in such a way that the gap or distance is just sufficient to allow the relative movements of two coupled elements to be expected in the measuring operation without the elements directly touching each other. Unnecessarily large gaps between coupled elements are thus avoided. The gap can be 1 to 2 millimeters, for example.

A special relative mobility of coupled elements, in particular for cornering, can also be achieved by the opposing surfaces of the coupled elements having one or more curved sections, for example in the manner of a circular arc or a club bottom.

A train composed of several elements and moved by a measuring system may need to be monitored with regard to the train's current position, for example by means of light barriers arranged in the measuring system. In particular, it may be of interest whether or when a train reaches or leaves the weighing platform of a scale. A light beam passing between two elements lying one behind the other at right angles to the direction of conveyance could be wrongly interpreted as the end of the train. This would be particularly conceivable in the case of unnecessarily large gaps between coupled elements. In order to completely exclude the risk of false triggering, a some embodiments of the invention provide that two elements lying directly behind each other in the direction of conveyance partially overlap each other when viewed transversely to the direction of conveyance by means of, for example, a lug-like projection. If the conveying direction corresponds to the longitudinal direction X, then the overlap could be formed in the transverse direction Y and/or in the vertical direction Z. The overlap can be created in a simple manner by a section of a preceding element extending above or to the side of a section of the following element. The decisive factor here is that the overlap or undercut is formed in the direction and at the height or width position of the elements at which a light barrier or a comparable sensor in the measuring system applies to the train to determine the end or beginning of the train.

In some embodiments, elements of a test body system are provided with different lengths or widths, wherein the lengths or widths are formed according to a grid dimension in which the length or width of an element is formed by a preferably integral multiple of a base length or base width, and wherein a shortest or narrowest element can have the base length or base width or a multiple of the base length or base width. This allows several individual elements to be combined in length and/or width to achieve the length and/or width of a single further element. This supports the modular structure of a train.

According to other embodiments of the invention, machine-readable identification means (devices) are provided as part of a test body system in order to be able to manually or automatically record the properties of individual elements or their loading with test weights. These identification means make it possible to record and evaluate various characteristic data within a train for at least one element, preferably for all elements. Such characteristic data can include:
  an element identification provided on the element which enables assignment of specific physical data (e.g., type, number, length, width, height, weight, empty weight) to the respective element;
  the position of the element within the train (T) relative to at least one other element;
  the loading of test weights according to the type and position of the test weights inside the receiving element;
  the weight distribution within the element, related to its longitudinal direction (X) and/or transverse direction (Y).

Preferably, the identification means are designed in such a way that they allow conclusions to be drawn as to which test weight is arranged at which position within a receiving element. This can be done, for example, by suitable sensors detecting whether a pocket or a specific position of a receiving element is occupied by a test weight and what size or type this test weight is. In particular, it is possible to detect which weight is located in which pocket. Knowing certain properties of the pocket (for example its size), and assuming that the pocket is equipped with a test weight to be assigned to this property (for example a test weight with a similar outer diameter as the inner diameter of the pocket), the respective weight can be determined from the occupancy of the pocket alone.

However, it is also conceivable to provide a pocket for the optional accommodation of different test weights. For this purpose, for example, a cylindrical pocket could be provided with concentric steps descending radially inwards, so that weights with a larger diameter sit on a higher step, while instead weights with a smaller diameter can be inserted into the receptacle formed by a lower step.

By automatically checking a pocket to see which area (in this example: which step) of the pocket is occupied by a weight, it is therefore possible to draw conclusions about the respective weight.

The test weights to be inserted into the pockets can be standard weights according to the recommendation OIML R 111, which also fulfil the requirements of the accuracy classes M1 or F1 or comply with the dimensions specified by this or other guidelines. The identification means are therefore preferably designed to enable an assignment to such standard weights, for example by detecting certain dimensions of the weights used.

The identification means can be based on any technologies known to the skilled person, for example barcode or RFID. Thus an identification device included in a test body system may take the form of a bar code or RFID tag or of some other device consistent with the given identification technology. The identification means can be arranged on or in an element in a changeable or unchangeable manner.

Preferably, the underside of an element has a circumferential chamfer or rounding to facilitate the shock-free transfer of the element from one surface of the measuring system to another adjacent surface.

A second aspect of the invention includes methods for testing measuring systems using a test body system of the aforementioned type comprises at least the following stages:
   a) Formation of a train with at least two elements coupled to each other, lying one behind the other in the X-direction and/or lying next to each other in the Y-direction, of which at least one element is a pick-up element;
   b) Loading a number n of the pockets of the receiving elements with test weights to form a total test load of the train, where n≥0;
   c) Moving the train in the X-direction through or along the measuring system;
   d) Acquisition and evaluation of measured values which the measuring system acquires in connection with at least one physical variable of the train, in particular its weight or its weight distribution.

In order to form a train with a certain total weight or a certain weight distribution, it is provided according to some embodiments of the invention that some or all pockets of some or all receiving elements of the train are equipped with the same or different test weights. However, methods according to the second aspect of the invention may also provide for the use of unloaded receiving elements for an "empty run" through the measuring system, in which the weight of the individual receiving elements is formed only by their empty weight (tare weight). The number n of pockets to be loaded is then zero.

A test body system according to the invention is basically suitable for a wide variety of measuring systems to which a test body with certain physical properties must be supplied in order to be able to check the correct function of the measuring system or an accuracy required for it. The physical properties associated with a test body, which can also be created or changed by fitting test weights, can be, among others:
   weight and weight distribution
   length, width, height, volume, smallest enclosing cuboid;
   radiation properties, especially with regard to X-rays.

A test body system according to some implementations of the invention is used for industrially used automatic or dynamic scales or other inspection systems which are loaded by means of a train formed by the elements of a test body system. Preferably, therefore, methods according to some implementations of the invention are directed towards the testing of a measuring system in the form of a scale.

These and other aspects, advantages, and features of the invention will be apparent from the following description of representative embodiments, considered along with the accompanying drawings.

BRIEF DESCRIPTION OF THE DRAWINGS

FIGS. 9, 10, and 11 show an alternative design for the coupling means.

DESCRIPTION OF REPRESENTATIVE EMBODIMENTS

Figure 1:
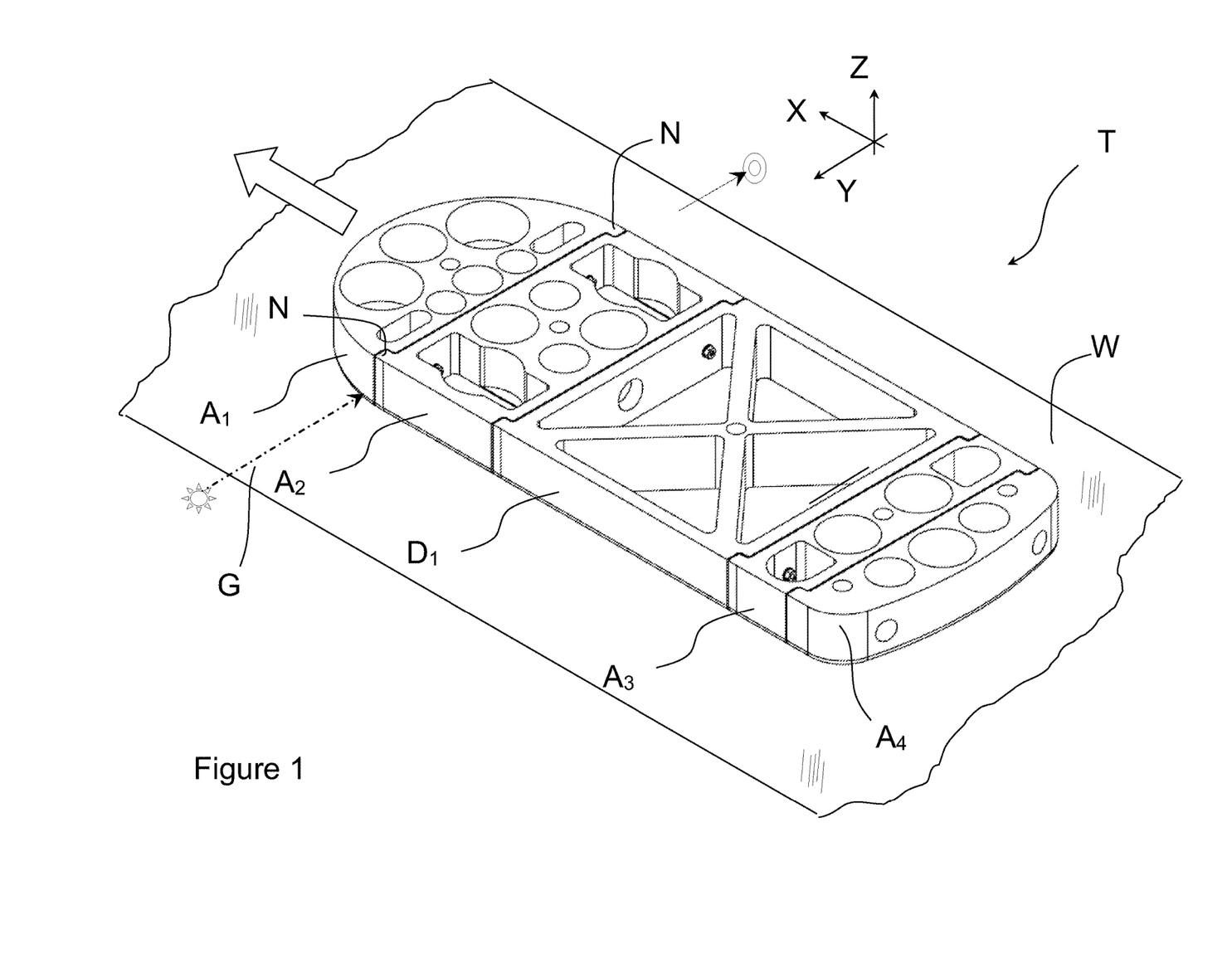
FIG. 1 shows a simplified perspective view of a train.

FIG. 1 shows a perspective view of a train T, made up of several elements of a test body system according to the invention, which is to be moved along a surface W of a measuring system in the direction indicated by the arrow. The train T extends essentially in a longitudinal direction X. A front element of the train is formed by a receiving element $A_1$ with an approximately semicircular cross section in top view. Adjacent to this in the longitudinal direction X is a further receiving element $A_2$, which has an approximately rectangular cross section. The two foremost receiving elements $A_1$, $A_2$ have approximately the same length. Behind them, a spacer element $D_1$ with an almost square cross section is inserted into the train, the length of which is approximately twice that of the receiving elements $A_1$ or $A_2$. Adjacent to the spacer element $D_1$ is a further rectangular receiving element $A_3$, the length of which is about half that of the receiving elements $A_1$ or $A_2$. The rear end is formed by a further receiving element $A_4$, the length of which is the same as that of the previous receiving element $A_3$, but which, in top view, has the cross section of a dished bottom. All the elements of the train have the same width in the transverse direction Y.

The individual elements are coupled to each other one behind the other via coupling means not shown in detail in FIG. 1. A gap (not visible in FIG. 1 due to its small dimensions) is maintained between directly coupled elements to allow relative movement of two coupled elements.

The receiving elements $A_1$ to $A_4$ are provided with various pockets U, which are designed to hold individual test weights. However, the train T according to FIG. 1 does not contain any test weights and is prepared for an empty run through the measuring system. The direction of travel indicated by the arrow here corresponds approximately to the longitudinal direction X in which the individual elements lie one behind the other.

Figure 2:
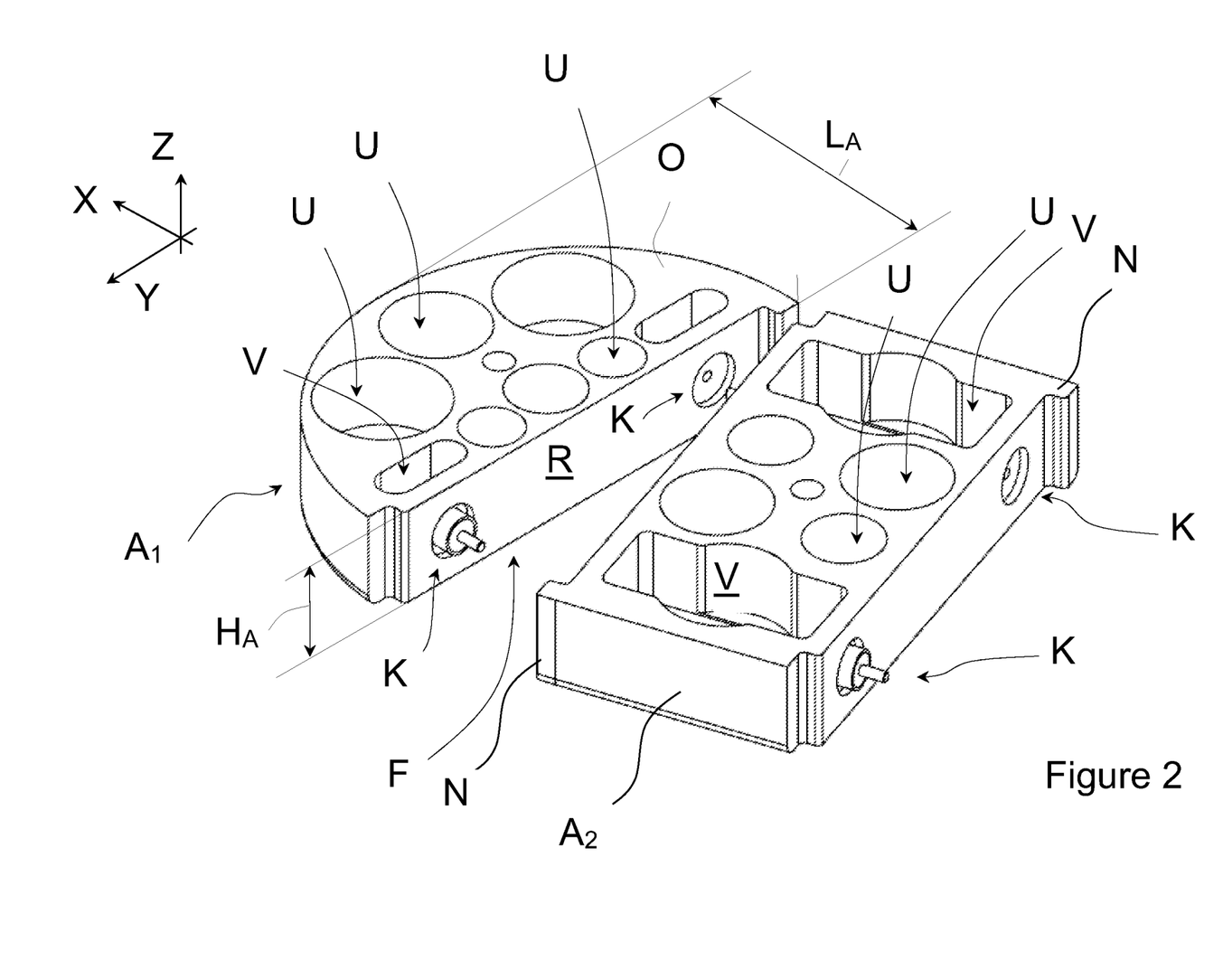
FIG. 2 shows two recording elements before their coupling in perspective view.

FIG. 2 shows the two receiving elements $A_1$ and $A_2$ according to FIG. 1 before they are coupled, slightly offset from each other. The semicircular front receiving element $A_1$ comprises—like all other receiving elements of the train T—essentially of a base body R, which has a preferably flat base surface F on its underside, opposite which is an upper surface O running parallel thereto at a distance $H_A$. The base body R has a length $L_A$ measured in the longitudinal direction X, a width $B_A$ measured in the transverse direction Y (not shown in FIG. 2) and a height $H_A$ measured in a vertical direction Z perpendicular to the longitudinal direction X and the transverse direction Y.

Pockets U, already known from FIG. 1, extend from the upper side O of the base body R in the direction opposite to the vertical direction Z into the depth. Stop means (not shown in the figures) are provided in the pockets U in order to hold a test weight inserted from above in the vertical direction Z. Apart from the stop means, the pockets U can completely penetrate the base body R with a constant cross section, which simplifies its manufacture. (Not all pockets are fully labelled in the figures).

In addition to the pockets U provided for receiving test weights, the first receiving element $A_1$ also contains (partially labelled) recesses V, which do not serve to receive weights but have instead been introduced to reduce the weight of the receiving elements. Such recesses can also be provided for fastening coupling means (see below). The further receiving element $A_2$ is also provided with pockets U, the function and design of which is identical to that of the first and all other receiving elements. However, the cross-sectional shape of the second receiving element $A_2$ is rectangular.

Coupling means K are shown on one end of the second receiving element, which serve to couple elements (A, D) lying one behind the other in the longitudinal direction X. The coupling means, which are not shown in more detail here, can comprise a receptacle or hole in an element. An elastic connecting means to be inserted into such a receptacle is also one of the coupling means. Coupling means of the same type are also provided on the end face of the receiving element $A_2$ opposite the coupling means K (not shown in FIG. 2) to enable coupling with the first receiving element $A_1$. Matching complementary coupling means K can be seen on the end face of the first receiving element $A_1$ facing the second receiving element $A_2$.

Figure 3:
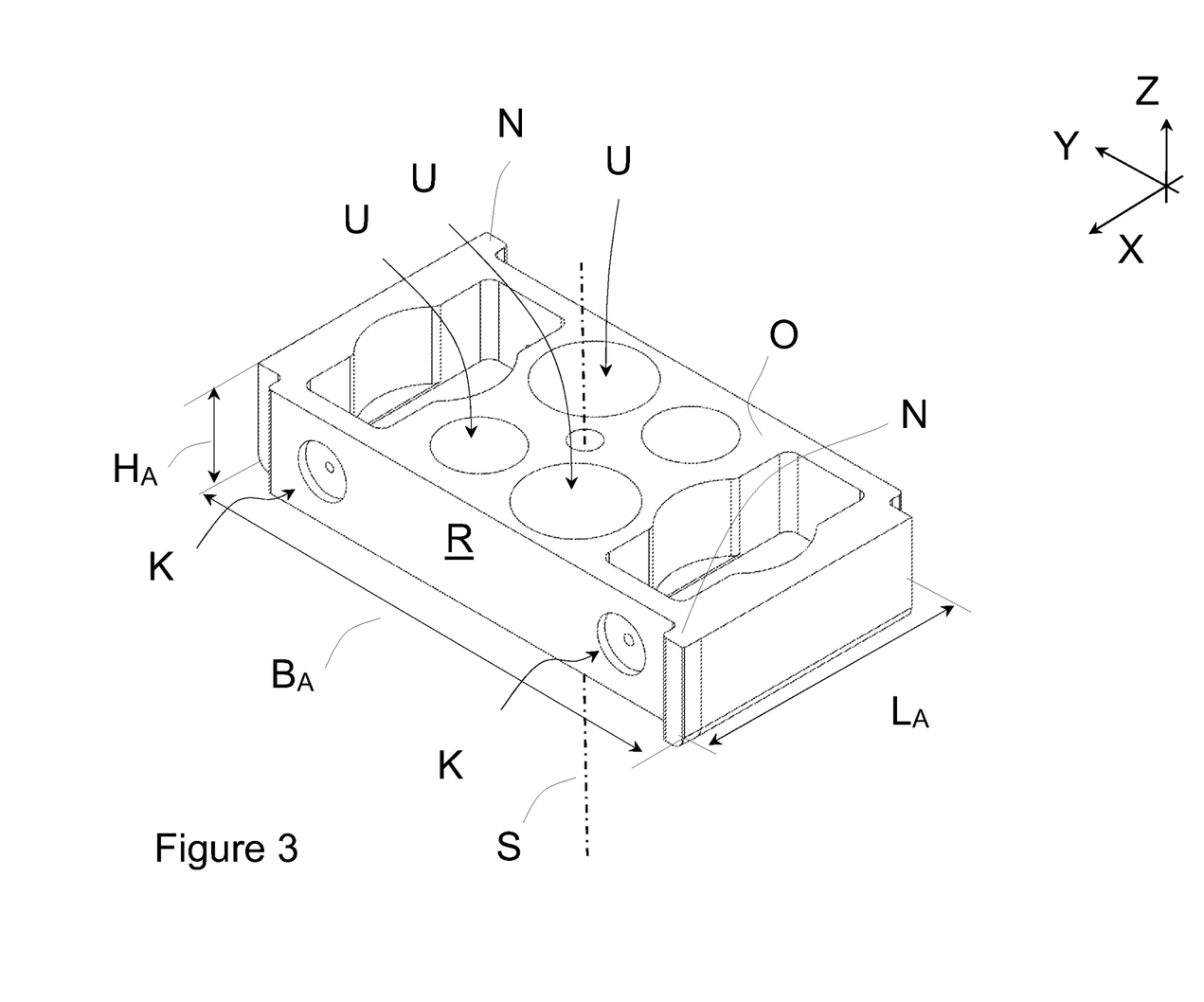
FIG. 3 shows a rectangular receiving element.

Those receiving elements and spacer elements which are intended to be arranged between other elements or which are not intended to form the beginning or the end of a train with a curved end face are preferably designed to be point-symmetrical with respect to an imaginary axis of symmetry S passing through the center of the respective exceptional element and running in the vertical direction H (see FIG. 3). This has the advantage that such a receiving element can also be used rotated by 180°, which facilitates the assembly of a train T.

FIG. 3 shows the receiving element $A_2$ in a different perspective view, whereby repeating reference signs have been partially omitted. FIG. 3 shows two lugs N, which can also be seen in the other figures, and which protrude a short distance from the base body R of the receiving element. The lugs serve to form a lateral overlap or undercut with respect to the transverse direction Y, in which each lug engages in a matching recess J on a coupled adjacent element. FIG. 1 shows an example of a light barrier which emits a light beam G above the surface W of the measuring system transversely to the conveying direction in order to be able to detect the beginning or end of a passing train with an opposite receiver. In order not to misinterpret the slight distance between the directly coupled elements (here $A_1$ and $A_2$) as such a train start or end, the lugs N block this light beam (depending on the direction of the light beam, the overlap or undercut can also be formed with respect to another spatial direction. In the case of a light barrier detecting in vertical direction Z, correspondingly arranged lugs could alternatively also form the required overlapping in vertical direction Z).

Figure 4:
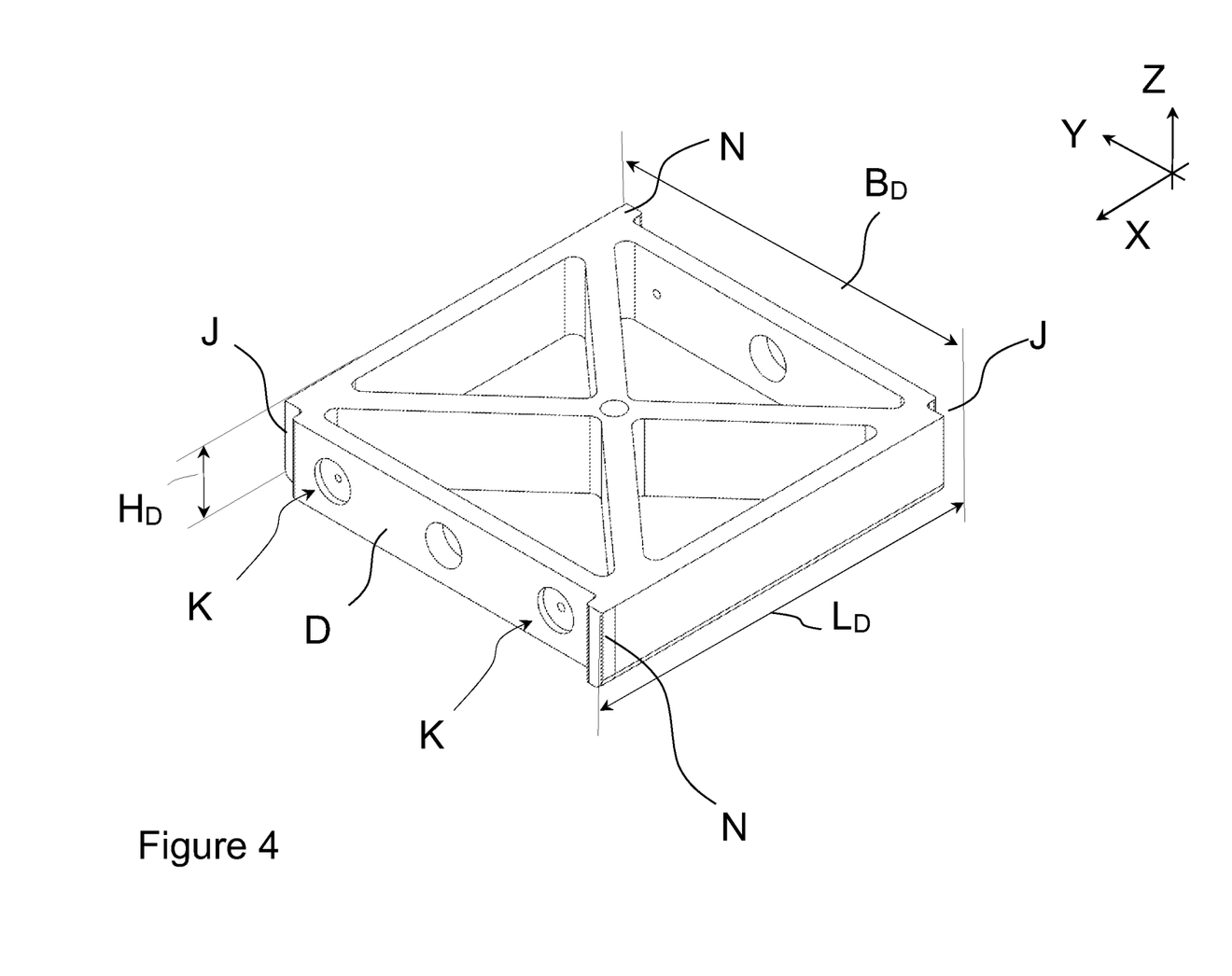
FIG. 4 shows a rectangular spacer element.

FIG. 4 shows an embodiment of a spacer element D. This is not used to hold test weights, but in particular to define a pre-definable distance between two other elements of a train. It extends over a width $B_D$, a length $L_D$ and a height $H_D$. In the example according to FIG. 1, the width and height of all elements are the same.

In order to make the spacer as light as possible, it can be made, for example, as a honeycomb structure, as shown in FIG. 4. The rectangular or square structure in the present case is formed by four circumferential wall sections representing the outer sides of the spacer element D. Two further wall sections extend diagonally between opposite corners and give the spacer element D the necessary rigidity.

The spacer elements of the test body system are also equipped with coupling means (K) in order to be coupled to other elements (receiving element or further spacer element). The coupling means K cooperating with a spacer element D are preferably designed or positioned in the same way as those of a receiving element in order to be able to optionally couple a receiving element or a further spacer element.

The lugs N or recesses H already presented for the receiving elements are also provided on the spacer elements in order to achieve the desired undercut.

Figure 5:
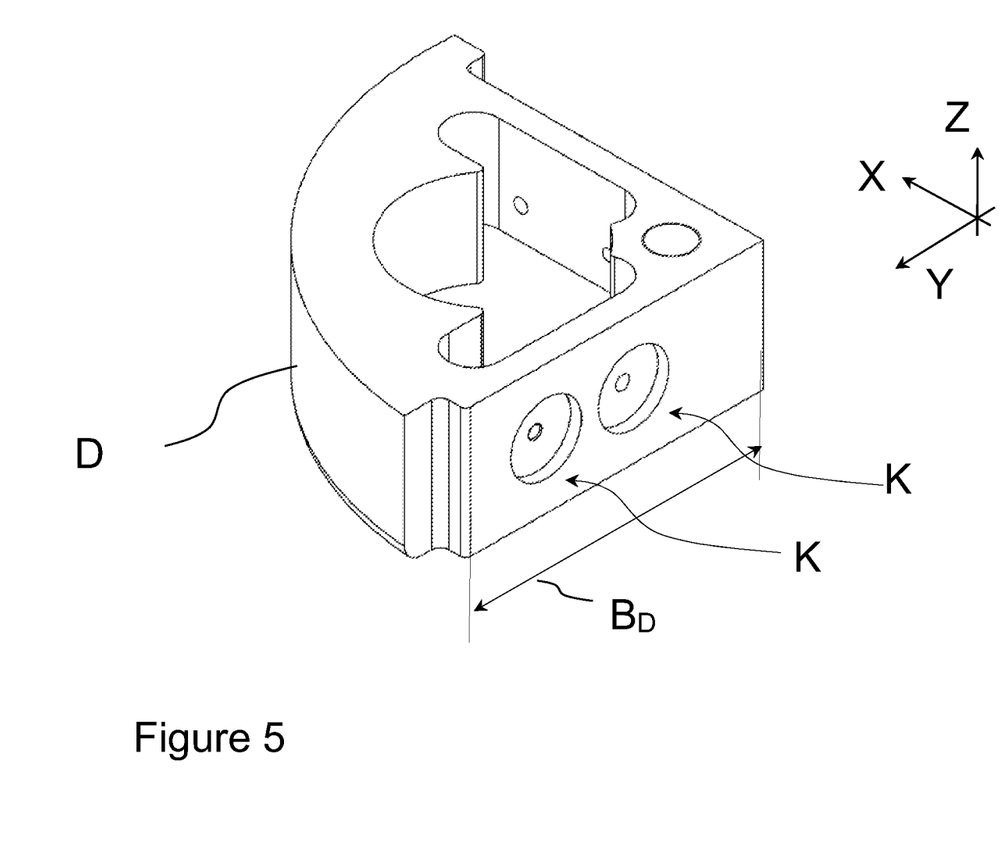
FIG. 5 shows a distance element in quarter-circle format.

FIG. 5 shows a further receiving element A, which has a quarter-circle cross section in top view. In the longitudinal direction X, the receiving element A can be coupled to another element using the coupling means indicated. No further coupling means are provided along the quarter-circle circumference, as this receiving element A is intended to form the beginning or end of a train. The width $B_A$ of the receiving element A is only half that of the elements shown in FIG. 1, for example. A further quarter-circular receiving element A can be arranged in the transverse direction Y next to the receiving element A according to FIG. 5 in such a way that both receiving elements together form a semicircular front with a total width which corresponds, for example, to the width of the train shown in FIG. 1. Alternatively, however, further, in particular rectangular, receiving elements or spacer elements can be arranged in the transverse direction adjacent to the first quarter-circular receiving element A, before the arrangement in the transverse direction ends with a quarter-circular receiving element A again.

Although the spacer elements and receiving elements shown in the figures do not show any coupling means that enable coupling in the transverse direction Y, such coupling or the provision of coupling means suitable for this is readily possible alternatively or additionally. Accordingly, it is possible to form a train T which has more than one element in the transverse direction and/or in the longitudinal direction. The size of the individual elements can be chosen differently and according to a grid in which the width or length of an element corresponds to a multiple of the width or length of another element.

Figure 6:
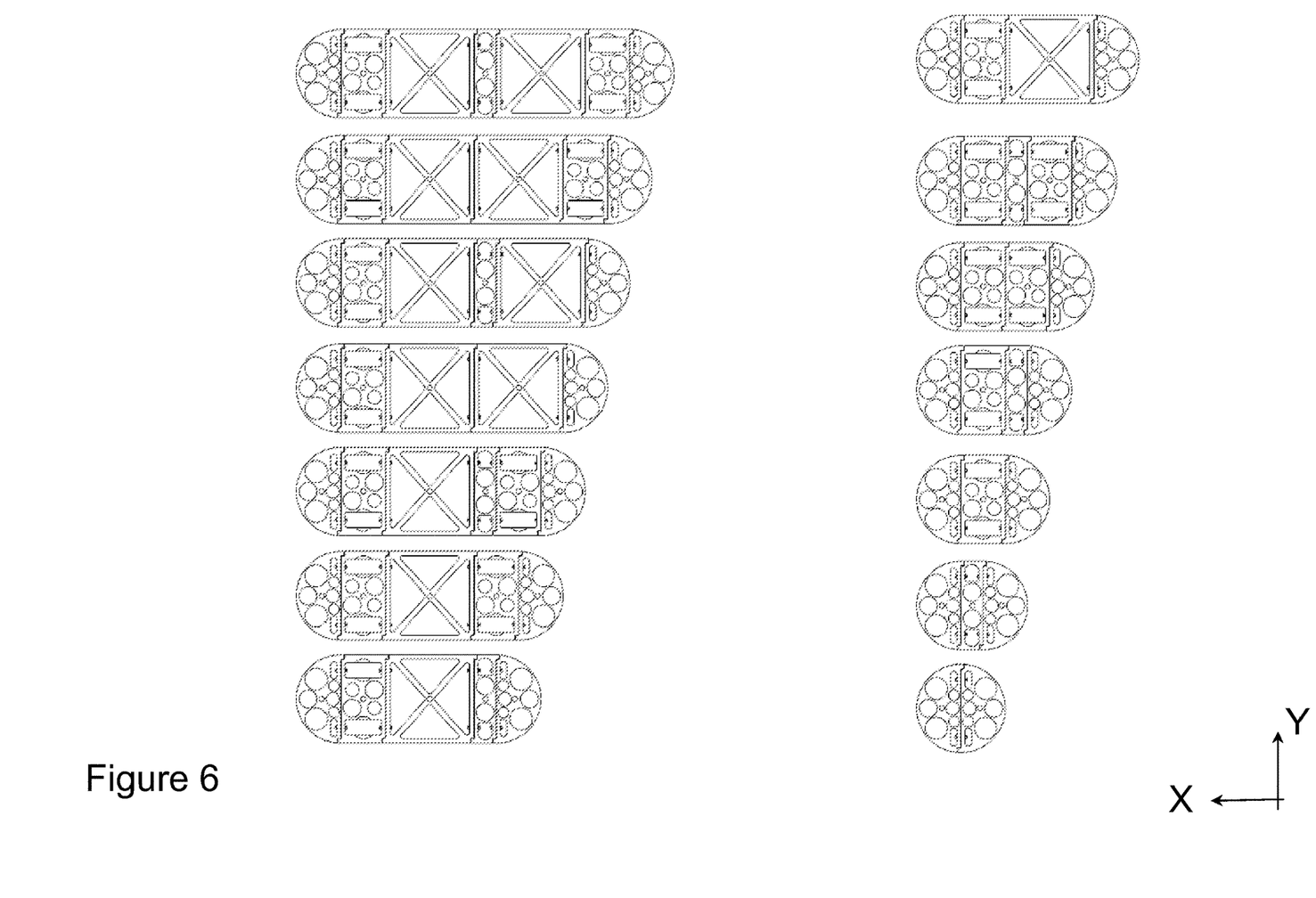
FIG. 6 shows various trains formed from some elements of a test body system according to the invention.

FIG. 6 shows an example of some trains T, which are not described in more detail, extending in the longitudinal direction X and each beginning and ending with a semicircular receiving element. Between them, further receiving elements or spacer elements can be arranged in a freely selectable sequence and length, whereby elements lying directly behind one another in the longitudinal direction X are coupled to one another by coupling means not shown in greater detail in FIG. 6.

Figure 7A:
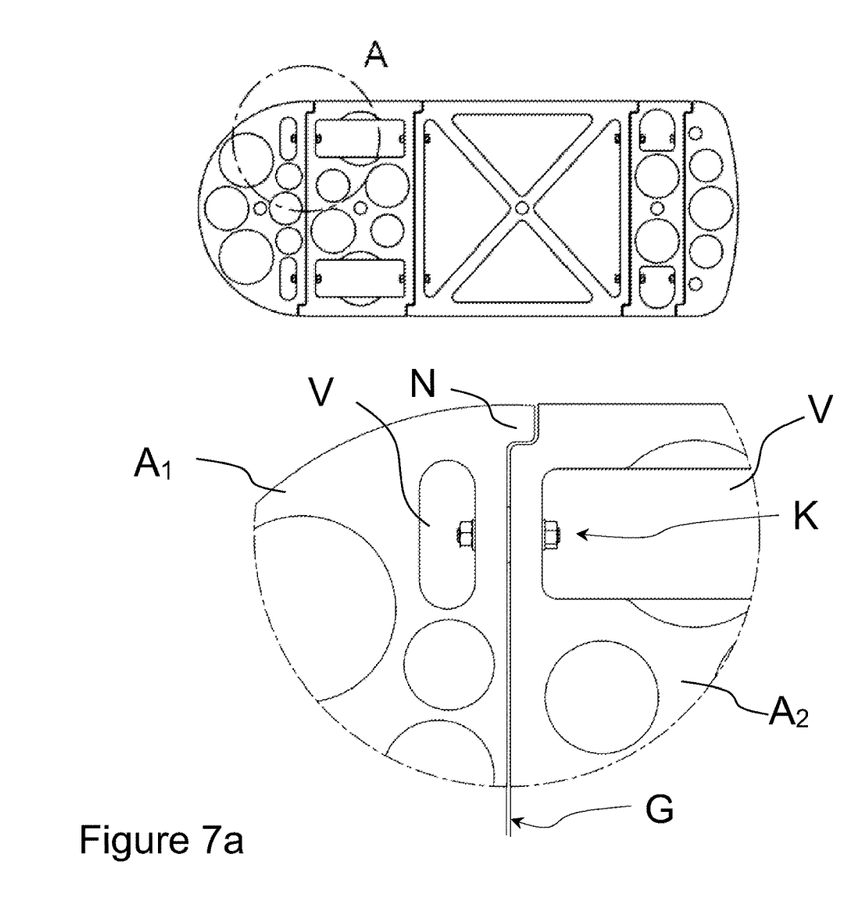
FIGS. 7 and 8 show respective detailed views of the coupling or coupling means.
Figure 7B:
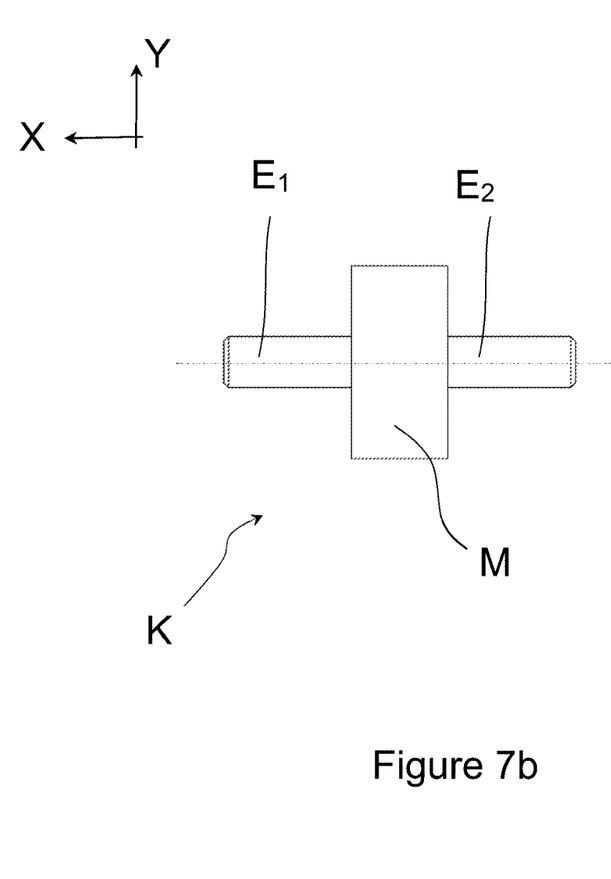

FIG. 7 shows an enlarged simplified view of the coupling of two elements. The area marked by the dotted circle A of two receiving elements $A_1$ and $A_2$ coupled to each other in the longitudinal direction X is shown enlarged in the lower part in a top view against the vertical direction Z. For this purpose, a coupling element shown in simplified form in FIG. 8 is inserted between the two receiving elements as part of the coupling means K.

The coupling element is essentially rotationally symmetrical about a longitudinal axis. Two separate connecting means $E_1$, $E_2$ in the form of threaded rods extend from a centrally arranged elastic core M in opposite directions along the axis of rotation. The threaded rods are each designed to pass through a bore in one of the two elements $A_1$, $A_2$ to be coupled together and to be screwed together at the rear with nuts.

The recesses V shown in FIG. 7, which in this case are not intended to accommodate test weights, allow access to the nuts so that the coupling can be carried out or released again as required. It can also be seen from FIGS. 1 to 8 that the coupling of two elements is preferably carried out via double coupling means, which are preferably positioned symmetrically to a central X-Z plane on the elements.

Figure 8:
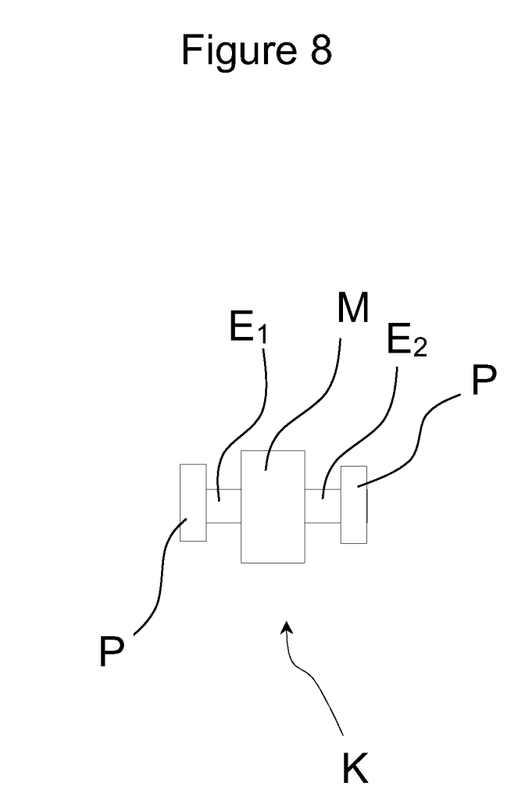
Figures 8A, 8B:
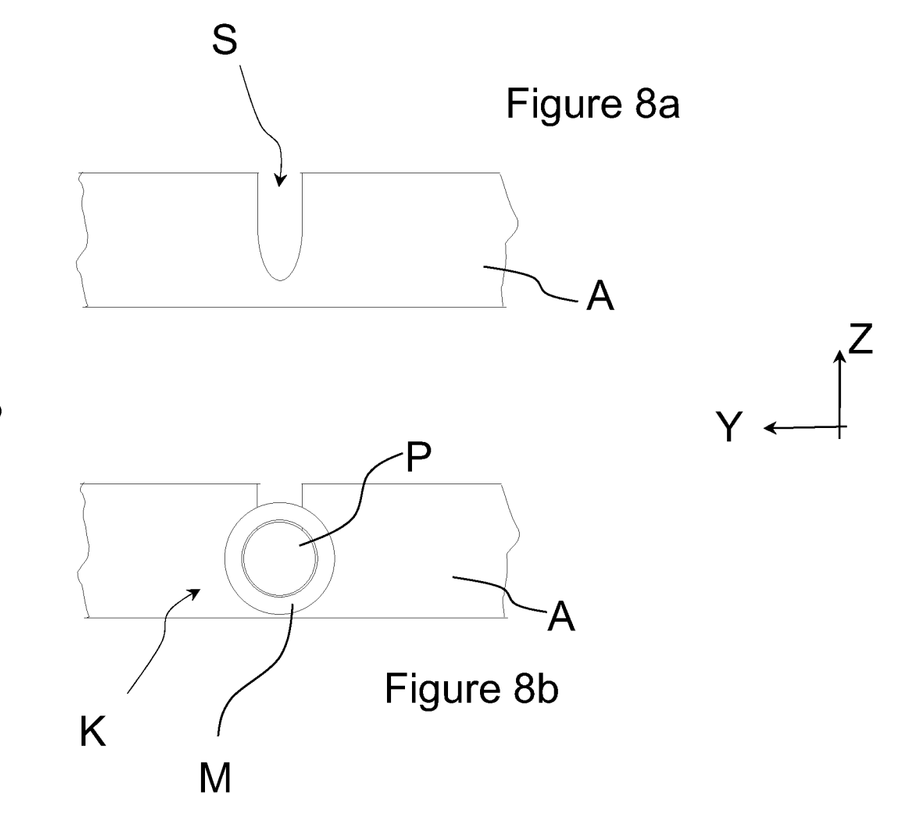

As shown in FIG. 8, the two threaded rods $E_1$, $E_2$ adjoining the elastic core M on both sides—and thus also the elements $A_1$, $A_2$ screwed to them—are movable relative to each other due to the elastic core M, so that, depending on the elasticity, translational and/or rotational relative movements are possible between the elements coupled to each other. This includes, in particular, relative movements in the vertical direction H or tilting movements about imaginary swivel axes, which run, in particular, in the transverse direction Y or vertical direction Z. In order to allow such a relative movement, the coupling means are designed in such a way that two coupled elements $A_1$, $A_2$ have a small distance or gap G between them.

FIG. 9 shows an alternative embodiment of the coupling means K in simplified form. The coupling means comprise a dumbbell-like body which, similar to the example in FIG. 8, has a central elastic section M with two bar-shaped or rod-shaped means of connection $E_1$, $E_2$ extending in opposite directions. Here, however, the means of connection are not designed as threaded rods. Instead, they each carry a flange-like extension P at their ends.

An elongated slot running in the vertical direction Z is made in a simplified end wall of an element A, the diameter of which corresponds approximately to the outer diameter of the connecting means E (FIG. 10). The dumbbell-like coupling means can be pushed into the slot S with one of the two connecting means E in such a way that the associated flange P engages behind the end wall of the element A, preferably in a clamping manner, while the elastic section M comes to lie on the outside of the element (FIG. 11) and preferably encloses the wall section lying in between in a clamping manner. A further element arranged opposite element A (and not shown in FIG. 9) can be coupled accordingly with a similarly formed slot S in the further element's end face via the other connecting means E with associated flange P, so that the elastic section M is arranged, preferably without play, between the two elements coupled together in this way.

This coupling K shown in FIG. 9 can be established or released particularly easily and without tools by simply inserting the dumbbell-type coupling means in or against the vertical direction Z between two elements A to be coupled with each other in the respective slot S.

The design features of individual receiving elements described above are not limited to the receiving element described in each case but are conceivable for all receiving elements of a test body system according to the invention, insofar as this is not functionally or geometrically excluded. This applies in particular to the arrangement or design of the axis of symmetry S, the coupling means K, the lugs N, the pockets U, the recesses V and the specific length or width or height.

As used herein, whether in the above description or the following claims, the terms "comprising," "including," "carrying," "having," "containing," "involving," and the like are to be understood to be open-ended, that is, to mean including but not limited to.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described representative embodiments are intended to illustrate the principles of the invention, but not to limit the scope of the invention. Various other embodiments and modifications to these representative embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

REFERENCE SIGNS

A Receiving element
B Width
D Spacer element
E Connection means
F Base area
G Gap
H Height
J Depression
K Coupling means
L Length
M Elastic section
N Lug
O Top side (of an element)
P Flange R Base body
S Slot
T Train
U Pocket
V Recess
W Surface
X Longitudinal direction
Y Transverse direction
Z Vertical direction

The invention claimed is:

1. A test body system comprising:
   (a) at least two elements that are adapted to couple to one another for forming a train that is guidable over a surface of a measuring system and has at least one of a predeterminable total test load, a predeterminable length, and a predeterminable width;
   (b) wherein at least one first element of the at least two elements includes a receiving element which extends with a first length in a longitudinal direction, with a first width in a horizontal transverse direction, and with a first height in a vertical direction that extends orthogonally to the longitudinal direction and to the horizontal transverse direction, the receiving element defining a base surface for resting on the surface of the measuring system;
   (c) wherein at least one further element of the at least two elements includes one of:
      (i) a further receiving element with the first length, first width, and first height dimensions or differing therefrom in at least one dimension, or
      (ii) a spacer element that extends a second length in the longitudinal direction, a second width in the horizontal transverse direction, and a second height in the vertical direction;
   (d) wherein each receiving element and each spacer element includes coupling means adapted to detachably couple to an element that is arranged directly behind or next to the respective receiving element or respective spacer element in the longitudinal direction or the horizontal transverse direction; and
   (e) each receiving element includes a base body that defines one or more pockets, wherein at least one pocket is adapted to receive a test weight.

2. The test body system of claim 1 including the spacer element, the spacer element not defining a pocket for receiving test weights.

3. The test body system of claim 1 with the coupling means of each receiving element is adapted to couple with the coupling means of each spacer element, thereby facilitating direct coupling between (a) two spacer elements, (b) two receiving elements, and (c) the receiving element and the spacer element.

4. The test body system of claim 1 with the base body defining an upper side that faces away from the base surface and the one or more pockets extending into the base body perpendicularly to at least one of the upper side and the vertical direction.

5. The test body system of claim 1 with at least one of the height ($H_A$) of each receiving element and the height ($H_D$) of each spacer element being smaller than at least one of a respective element length ($L_A$, $L_D$) and a respective element width ($B_A$, $B_D$), wherein at least one of $(L_A, L_D) > (H_A, H_D)$, or $(B_A, B_D) > (H_A, H_D)$, or $(L_A, L_D) > 5*(H_A, H_D)$, or $(B_A, B_D) > 3*(H_A, H_D)$, or $H_A = H_D$, or $B_A = B_D$.

6. The test body system of claim 1 wherein the spacer element includes a spacer element body that defines at least one of a honeycomb structure, a bar structure, and at least one recess that partially or completely penetrates the spacer element body in the vertical direction.

7. The test body system of claim 1 wherein the at least two elements are adapted to be coupled directly to one another in the longitudinal direction and partially overlap one another in the horizontal transverse direction.

8. The test body system of claim 1 with at least one of the receiving element and the spacer element including an outer cross section in the longitudinal direction and horizontal transverse direction with at least one of:
   (a) a shape of a regular or irregular polygon, and
   (b) an at least partially rounded section extending over the horizontal transverse direction and having the shape of a dished end or an arc of a circle, a quarter circle, or a semicircle.

9. The test body system of claim 1 with the coupling means arranged to transmit at least one of a tensile force, a shear force, and a compressive force between the at least two elements, the coupling means including an elastic section for maintaining coupling and at least one of:
   (a) allowing tilting of the at least two elements relative to each other within pre-definable tolerances and about a tilting axis running in the longitudinal direction, the horizontal transverse direction, or the vertical direction,
   (b) allow a translatory movement of the at least two elements relative to each other,
   (c) damp transmissions of shocks between the at least two elements, and
   (d) cushion transmissions of shocks between the at least two elements.

10. The test body system of claim 1 with the at least two elements directly coupled to each other and forming a space therebetween that is arranged to essentially avoid further direct contact between the at least two elements caused by relative movements of the at least two elements.

11. The test body system of claim 1 with the at least two elements having at least one of different lengths and different widths, the different lengths or different widths being formed according to a grid dimension in which an element length or element width is formed by an integral multiple of a basic length or basic width, and wherein a shortest element or narrowest element is the basic length or basic width or a multiple of the basic length or basic width.

12. The test body system of claim 1 further including a machine-readable identification device for manually or automatically recording, within the train, at least one of:
   (a) an element identification that is provided on at least one element of the at least two elements,
   (b) a position of the at least one element within the train relative to at least one further element,
   (c) a dimension of the at least one element in at least one of the longitudinal direction, the horizontal transverse direction, and the vertical direction,
   (d) an unladen weight of the at least one element;
   (e) placement of each test weight according to a type and position of the respective test weight within the at least one element,
   (f) a total weight of the at least one element, and
   (g) a weight distribution of the at least one element in at least one of the longitudinal direction and the horizontal transverse direction.

13. A test body train comprising:
   (a) at least two elements of a test body system;
   (b) wherein at least one first element of the at least two elements includes a receiving element which extends with a first length in a longitudinal direction, with a first width in a horizontal transverse direction, and with a first height in a vertical direction that extends orthogonally to the longitudinal direction and to the horizontal transverse direction, the receiving element defining a base surface for resting on a surface of a measuring system;
(c) wherein at least one further element of the at least two elements includes one of:
  (i) a further receiving element with the first length, first width, and first height dimensions or differing therefrom in at least one dimension, or
  (ii) a spacer element that extends a second length in the longitudinal direction, a second width in the horizontal transverse direction, and a second height in the vertical direction;
(d) wherein each receiving element and each spacer element includes coupling means adapted to detachably couple to an element that is arranged directly behind or next to the respective receiving element or spacer element in the longitudinal direction or the horizontal transverse direction; and
(e) wherein each receiving element includes a base body that defines one or more pockets, wherein at least one pocket is adapted to receive a test weight.

14. A method of testing a measurement system using a test body system, the method including:
  (a) forming a train with at least two elements coupled to each other, the at least two elements lying one behind the other in an X-direction or lying next to each other in a Y-direction, the at least two elements including one or more receiving elements and each receiving element including a pocket;
  (b) placing one or more test weights in the respective pocket of one or more of the one or more receiving elements to form a total test load of the train;
  (c) moving the train through or along the measurement system in the X-direction; and
  (d) acquiring measured values from the measurement system as the train is moved through or along the measurement system, the measured values characterizing at least one physical variable of the train.

15. The method of claim 14 wherein placing one or more test weights in the respective pocket of one or more of the one or more receiving elements to form the total test load of the train produces a predeterminable weight distribution along the train.

* * * * *